United States Patent [19]

Koerber, Sr. et al.

[11] Patent Number: 5,108,063
[45] Date of Patent: Apr. 28, 1992

[54] HOSPITAL ROOM COMPUTER MOUNTING ARM

[75] Inventors: Clement J. Koerber, Sr., Batesville; L. Dale Foster, Brookville, both of Ind.; William H. Peck, Gainsville, Fla.

[73] Assignee: Hill-Rom Company, Inc., Batesville, Ind.

[21] Appl. No.: 607,545

[22] Filed: Nov. 1, 1990

[51] Int. Cl.⁵ .......................................... F16M 13/00
[52] U.S. Cl. .................................................. 248/284
[58] Field of Search ............... 248/284, 585, 586, 587, 248/639, 664, 674, 123.1, 125, 917, 919, 922, 923, 280.1, 281.1, 571, 325, 648

[56] References Cited

U.S. PATENT DOCUMENTS

| | | |
|---|---|---|
| 1,369,303 | 2/1921 | De Haven . |
| 1,985,593 | 12/1934 | Allen . |
| 2,558,416 | 6/1951 | Brack . |
| 2,630,854 | 3/1953 | Neher ................................... 248/587 |
| 2,635,030 | 4/1953 | Stebbins et al. . |
| 3,081,138 | 3/1963 | Stebbins . |
| 3,224,827 | 12/1965 | Foster et al. . |
| 3,490,727 | 1/1970 | Miller ............................... 248/281.1 |
| 3,857,623 | 12/1974 | Schneller ............................ 312/266 |
| 4,076,351 | 2/1978 | Wyant ................................. 312/247 |
| 4,523,732 | 6/1985 | Biber .................................. 248/123.1 |
| 4,646,211 | 2/1987 | Gallant et al. ........................ 362/149 |
| 4,716,847 | 1/1988 | Wilson ................................ 248/284 |
| 4,836,478 | 6/1989 | Sweere .............................. 248/123.1 |
| 4,852,500 | 8/1989 | Ryburg .............................. 248/919 |

Primary Examiner—Alvin C. Chin-Shue
Assistant Examiner—Robert A. Olson
Attorney, Agent, or Firm—Wood, Herron & Evans

[57] ABSTRACT

An extendable and retractable computer mounting arm for mounting a computer to the wall of a patient treatment room allowing in the retracted position the computer to be stored close to the wall and in the extended position electronic information relating to the patient to be accessed through the computer at a point of patient care zone adjacent the patient but spaced from the wall, including a computer mounting bracket, a wall mounting bracket for mounting with respect to the wall of the patient treatment room, support arms extending between and pivotally connecting the computer mounting bracket and the wall mounting bracket permitting the computer mounting bracket to be articulated between the retracted and extended positions, a pneumatic spring to assist in extending and retracting the mounting arm, and a spring mount for mounting the wall bracket with respect to the wall permitting the wall mounting bracket to flex with respect to the wall on the imposition of a force to the computer mounting arm to prevent the arm from being accidentally dislodged from the wall.

15 Claims, 4 Drawing Sheets

HOSPITAL ROOM COMPUTER MOUNTING ARM

BACKGROUND OF THE INVENTION

This invention relates to patient care and medical treatment facilities and, more particularly, to a mounting arm for mounting a computer in proximity to a patient in a patient care facility, hospital room, nursing home room, and the like.

Data processing units, referred to herein broadly as computers, have become a fixture in many patient rooms for the entry and retrieval of electronic information relating to the individual patient's care, treatment, and condition. Such computers may include a bar code reader which reads a bar code on the patient's wristband to identify the patient to the computer to access the patient's records.

A problem in the use of computers in hospital rooms and other patient care rooms lies in permanently mounting the computer in the room in close proximity to the patient permitting the nurse or attending physician to access the work station while still keeping close contact with the patient. However, the computer and computer mount must not interfere with other items and equipment located in the hospital room including medical outlets, patient cabinets, and even mobile clinical equipment. Further, access to the computer must be relatively quick and easy and convenient, e.g., allowing easy eye-level access to the computer keyboard and screen. Finally, the structural integrity of the computer mount must be such as to provide a rigid mounting for the computer which will not be damaged by accidental contact with mobile equipment or other moving items within the room.

SUMMARY OF THE INVENTION

It is among the principal objects of this invention to provide a mounting arm for rigidly and permanently mounting a computer within a patient care facility, for example, a hospital room, a nursing home room, or other patient care area, which allows electronic information to be accessed within a patient care zone spaced from the wall allowing the nurse or attending physician to access the computer while still keeping close contact with the patient.

Still further, when not in use, the mounting arm may be retracted to a position lodging the computer close to the wall out of the way of patient cabinets and mobile equipment in the room. To this end, the computer mounting arm of the present invention is an extendable and retractable arm which mounts the computer to the wall of a patient treatment room allowing, in the retracted position, the computer to be stored out of the way close to the wall; and, in the extended position, the computer to be accessed at a point within a patient care zone spaced from the wall, e.g., up to 30 inches from the wall. The extended position allows the nurse or attending physician to access the computer while still keeping close contact with the patient and also puts the bar code reader conveniently close to the patient's wristband for inputting and accessing electronic data from the computer.

In accordance with a presently preferred embodiment of the invention, the computer mounting arm includes a computer mounting bracket, a wall bracket for mounting the computer mounting bracket with respect to the patient treatment room wall, and a pair of support arms extending between and pivotally attached to the computer mounting bracket and the wall bracket. A computer including a keyboard and video display screen is mounted on the computer mounting bracket. The support arms permit the computer mounting bracket and in turn the computer to be articulated between a retracted position wherein the computer mounting bracket and computer are in an upright position close to the wall and an extended position wherein the computer bracket and computer extend into a point of patient care, for example, up to 30 inches from the wall adjacent the patient bed. A protective handle extends forwardly from the computer mounting bracket providing a grip for articulating the mounting arm and also serving as a bumper to protect the computer.

Preferably, a pneumatic spring also extends between the computer mounting bracket and the wall bracket to provide a substantially constant force rate spring to assist in extending and retracting the computer mounting arm quietly and effortlessly between the extended position and the retracted, upright position against the wall. The computer electrical and data linking wiring extends along the back of the computer mounting bracket and through he support arms to the wall.

The computer mounting arm further may include means for mounting the wall bracket to the wall of the patient treatment room under a spring force operative to normally hold the wall bracket rigidly with respect to the wall but to permit the wall bracket to flex with respect to the wall on the imposition of a force to the computer mounting arm sufficient to overcome the spring force such as by the accidental sideways collision between the extended arm and a piece of mobile clinical equipment or other movable item in the room or the patient attempting to support himself by the handle, e.g., while getting in or out of bed. This spring mounting thus prevents the computer mounting arm from being accidentally dislodged from the wall.

In the retracted position, the computer is lodged close to the wall in an upright out-of-the-way position against the wall. This allows room for various medical outlets, a patient cabinet below the computer, and the positioning of mobile clinical equipment in the room with respect to the patient. However, even in the upright position, eye-level access to the computer keyboard and screen is provided.

DETAILED DESCRIPTION OF THE INVENTION

Figure 1:
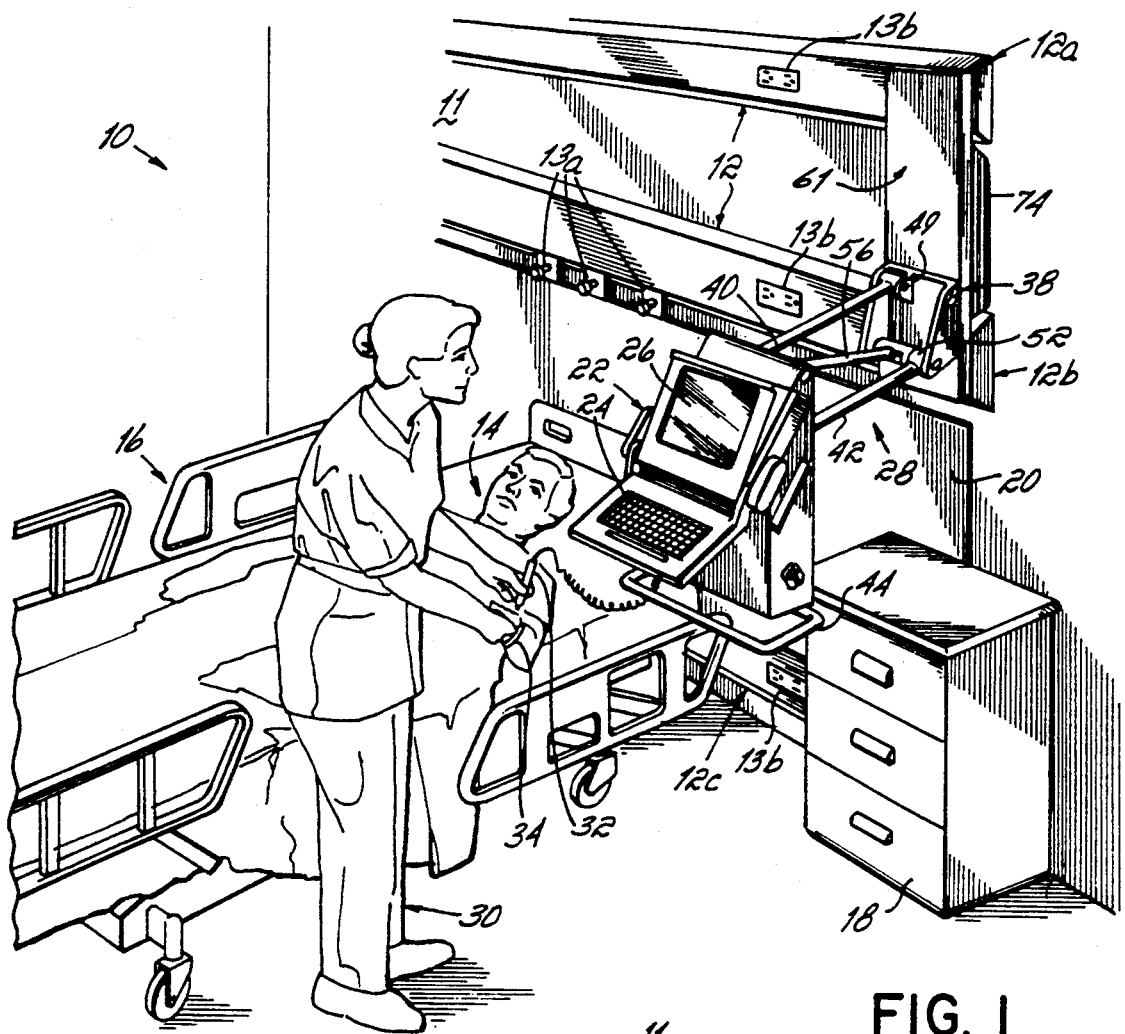
FIG. 1 is a pictorial view showing the location of computer mounting arm of the present invention with computer mounted thereon in a patient room.

Referring first to FIG. 1, a typical patient room 10 includes a wall 11 having a headwall 12 mounted thereon on which are located various patient care or treatment service outlets, such as medical gas outlets 13a, electrical outlets 13b, and the like. A patient 14 in a hospital bed 16 is wheeled close to the headwall 12 to provide the patient with ready access to the medical service outlets provided by the headwall 12. The room 10 may also include articles of furniture such as a patient cabinet 18. One form of hospital headwall 12 in use today to which this invention is particularly adapted is the Horizon Headwall sold by the assignee of this invention. The Horizon Headwall is shown in U.S. Pat. No. 4,646,211, which disclosure is incorporated herein by reference, and comprises in general in one embodiment three horizontal raceways spaced vertically on the room wall 11. The top raceway 12a may include a patient reading light (not shown) and standard voltage electrical outlets 13b. The middle raceway 12b may carry various patient care outlets, including movable medical gas outlets 13a for such gases as air, oxygen, and nitrous oxide; suction; nurse call; and standard voltage electrical outlets 13b. The lower raceway 12c may include electrical outlets 13b and also a bed locator (not shown). A hose cover panel 20 extends between the lower 12c and intermediate 12b raceways to conceal and protect hoses delivering medical gas to the gas outlets 13a.

A patient care zone lies between the headwall 12 and the patient 14 generally extending down to the patient's waist. In this position, various medical services are made available to the patient.

In accordance with the principles of this invention, a computer 22 which includes a keyboard 24 and video display screen 26 is mounted with respect to the hospital room wall 11 by means of a computer mounting arm 28. In the embodiment shown in FIGS. 1-4, the computer mounting arm 28 is mounted in cooperation with the headwall system 12 mounted to and protruding outwardly from the wall 11. In FIG. 1, the computer mounting arm 28 is shown in its extended position making the computer 22 accessible at the point of patient care which may extend up to 30 inches from the wall. This allows the nurse or attending physical 30 to access the computer 22 while keeping close contact with the patient 14. As also shown in FIG. 1, the extended position of the mounting arm 28 puts the bar code reader 32 conveniently close to the patient's wristband 34. The wristband 34 includes a bar code to be read by the reader 32 identifying the particular patient to the computer to access the patient's records.

Figure 2:
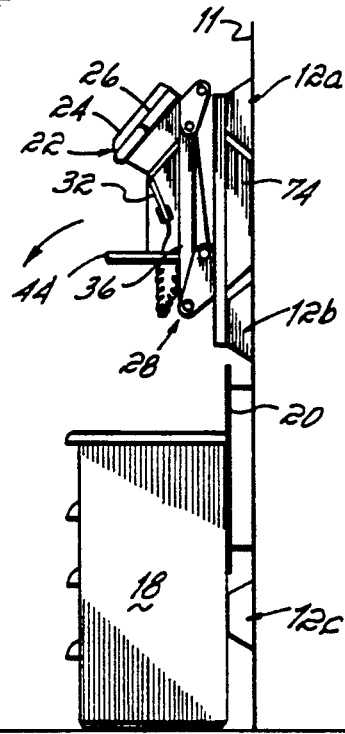
FIG. 2 is a side elevation view showing the computer and mounting arm in the retracted position.

In the retracted position as shown in FIG. 2, the keyboard 24 is folded over the display screen 26 and the computer 22 is lifted to an upright position whereby it is stowed close to the wall 11 out of the way of access to medical outlets 13a, 13b, patient cabinet 18, or even mobile clinical equipment which may be brought into the room.

Figure 3:
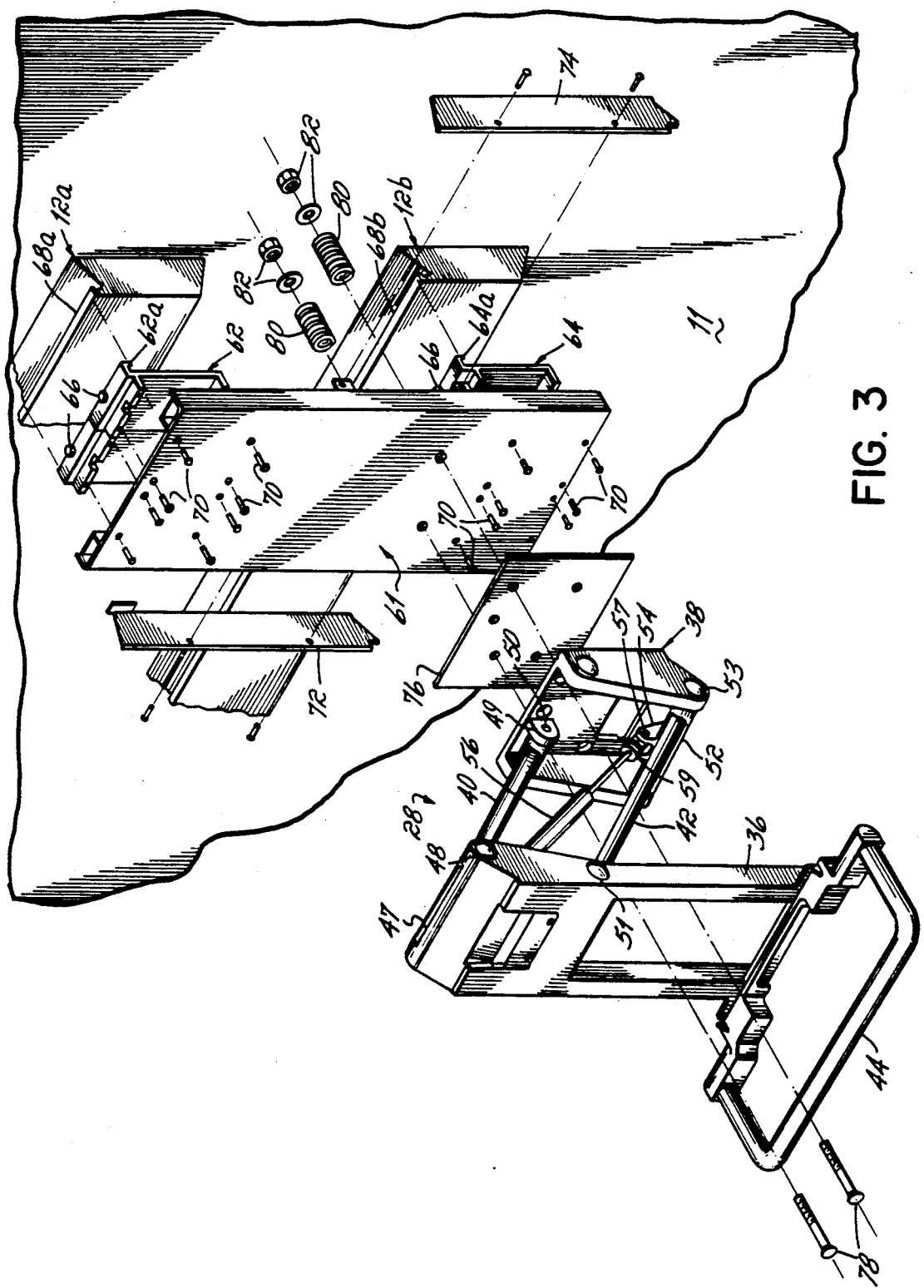
FIG. 3 is an exploded isometric view of the computer mounting arm of the present invention and one embodiment of the apparatus for mounting the arm to a headwall.
Figure 4:
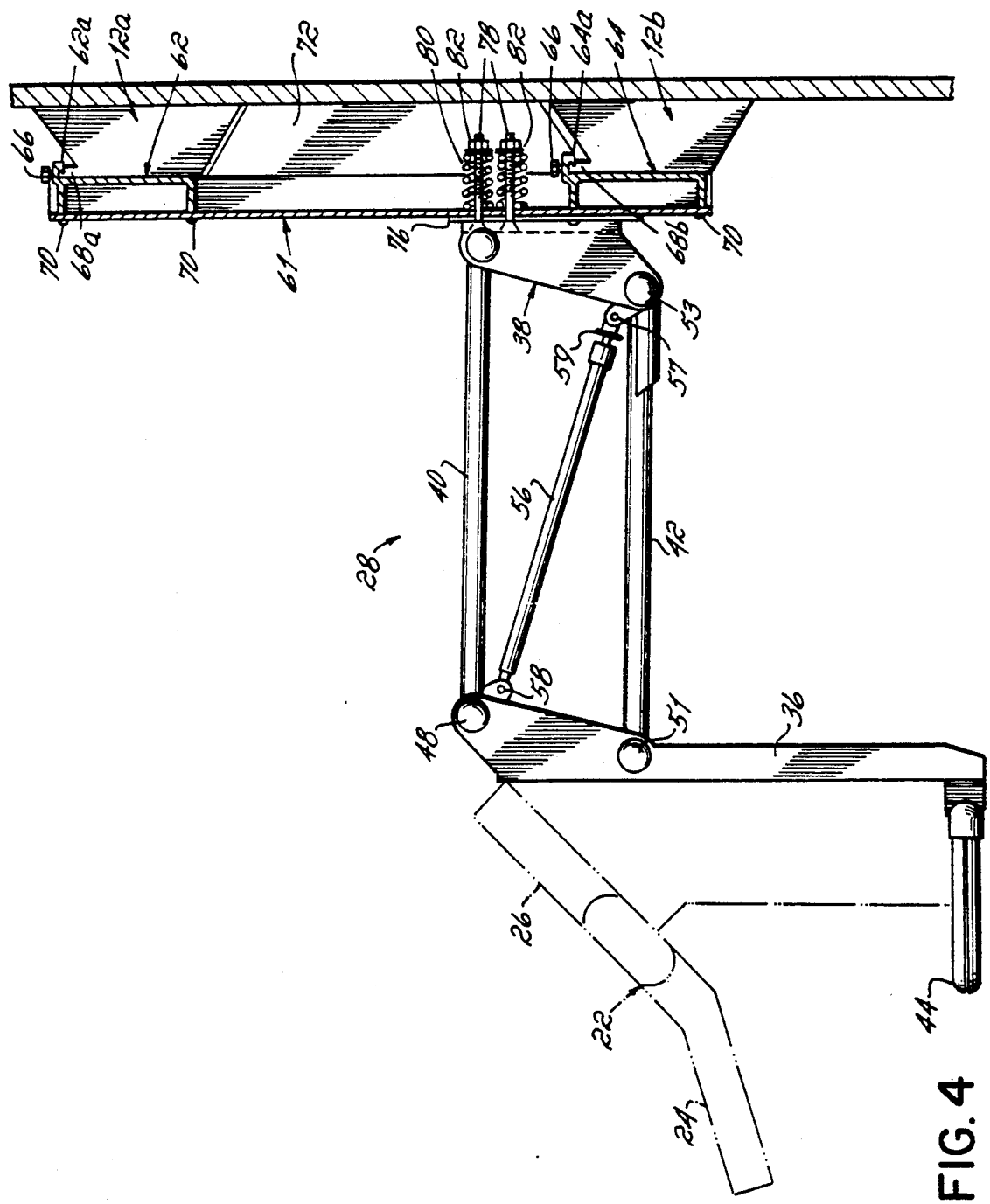
FIG. 4 is a side view with portions in cross section showing the mounting of the computer mounting arm shown in FIG. 3 with respect to the room headwall.
Figure 5:
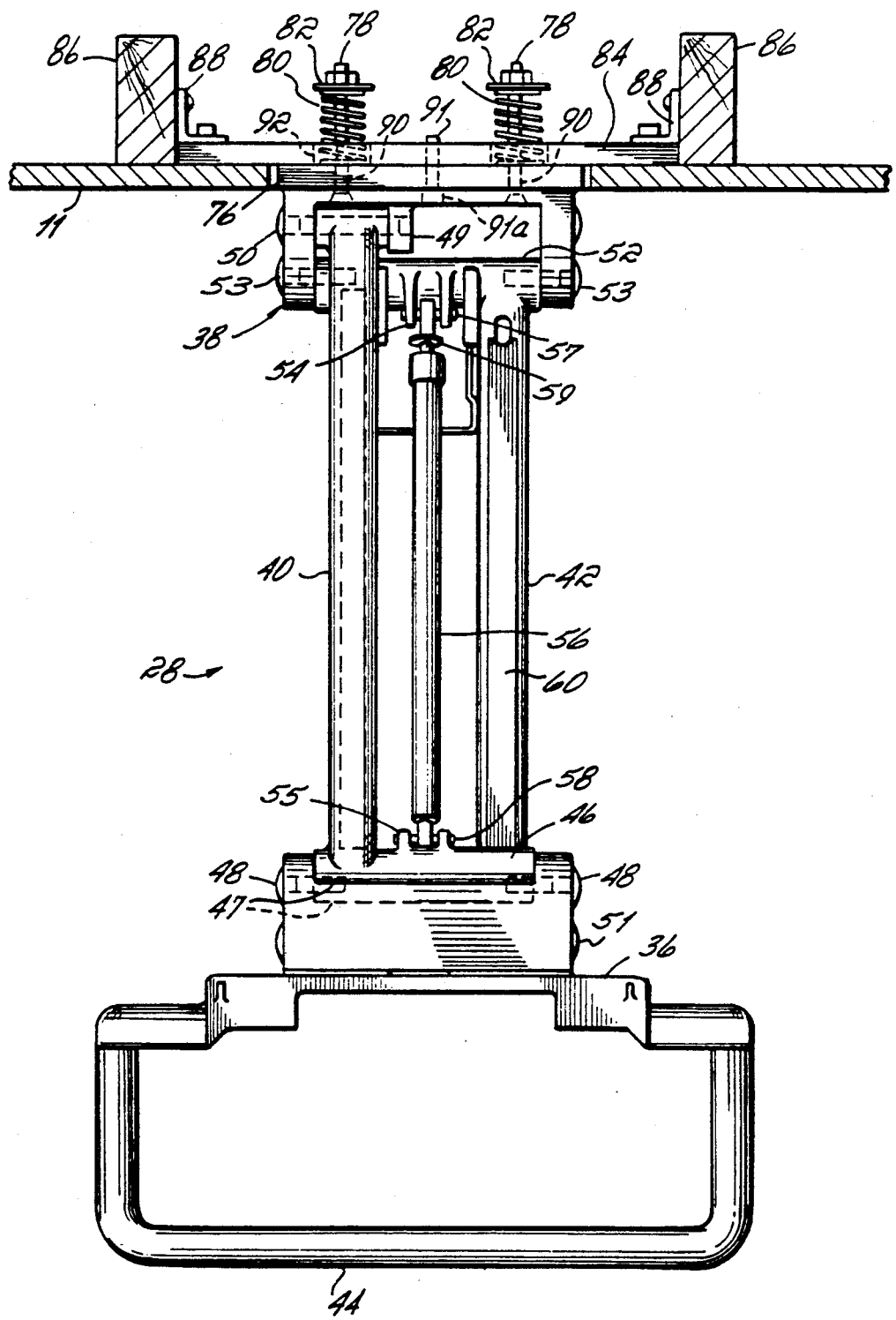
FIG. 5 is a top view of the computer mounting arm of the present invention showing an alternative means for mounting the arm to the wall.

Referring now in addition to FIG. 3-5, the computer mounting arm 28 includes a computer mounting bracket 36, a wall bracket 38 for mounting the computer mounting bracket 36 with respect to the room wall 11, and left and right support arms 40, 42, respectively, extending between and pivotally mounted to the computer mounting bracket 36 and the wall bracket 38. The computer mounting bracket 36 has a handle 44 extending forwardly into the room 10 which may be grasped to articulate the mounting arm 28 between its extended position as shown in FIG. 1, and its retracted position, as shown in FIG. 2. The handle 44 also acts as a bumper to protect the computer. In this connection, the handle 44 may be urethane coated to provide a sure grip also and a resilient surface to absorb impact.

The left support arm 40 has a cylindrical boss 46 (FIG. 5) at its forward end extending transverse to the long axis of the support arm 40. This boss 46 is received in a recess 47 in the rear of the computer mounting bracket 36 and is secured therein for pivotal movement by a pair of pins 48 extending in either side of the computer mounting bracket 36. At the opposite end, the left support arm 40 is pivoted in a bracket 49 formed on the left side of the wall bracket 38 and is secured therein by means of a pin 50 for pivotal movement.

The right support arm 42 is pivotally attached to the rear of the computer mounting bracket 36 by means of a pin 51. At its rearward end, the right support arm 42 includes a cylindrical boss 52 which extends between the sides of the wall bracket 38. Pins 53 passing through the sides of the wall bracket 38 secure the right support arm 42 for pivotal movement therein. Boss 52 of right support arm 42 includes a clevis 54 located generally midway between its ends. Boss 46 of the left support arm 40 includes an opposed clevis 55 (FIG. 5) located generally midway between its ends at the forward end of the left support arm 40. A pneumatic spring 56 extends between the clevises 54 and 55 and thus between the left 40 and right 42 support arms and is pivotally connected thereto by pins 57 and 58, respectively. The pneumatic spring 56 provides a substantially constant spring rate force permitting the computer mounting bracket 36 with computer 22 attached thereto to be lifted and lowered quietly and effortlessly. In the arm extended position, the piston of the pneumatic spring is fully retracted in the cylinder (FIGS. 4 and 5); and, in the arm retracted position, wherein the computer mounting bracket 36 is close to the wall, the piston is fully extended from the cylinder. A number of stops or spacers, such as rubber snubbers 59, may be mounted on the pneumatic spring piston between the rearward end of the cylinder and the clevis 54 to limit the amount of piston retraction in the cylinder and thereby to vary the extent of extension of the computer mounting arm 28 into the room.

Both the left 40 and right 42 support arms include a recess therein extending along their lengths for receiving electrical power and data linking cables connecting the computer 22 to a source of power and the data storage and retrieval system. In a present embodiment of the invention, the data linking cabling extends along the length of the right support arm 42 in the recess and is covered by a cover plate 60 screwed to the support arm 42 (FIG. 5). The electrical power cable to the computer 22 extends along the length of the left support arm 40 in a like recess. That recess is closed by a like cover plate on the underside of the arm 40 as it is shown in FIG. 5. The cabling extends out of the arms 40, 42 at their ends. That is, at the forward end of the arm 28 the cabling exits the arms 40, 42 and travels down the back of the bracket 36 to be connected to the rear of the computer 22. At the opposite end close to the wall, the cabling exits the arms and may be plugged into suitable receptacles or terminals, for example, mounted on the raceway 12b.

The position of the computer 22 on the bracket 36 is shown in phantom in FIG. 4 in the arm extended position with the keyboard 24 swung outboard from the screen 26 for use.

The present invention contemplates two different systems for mounting the arm 28 with respect to the wall 11. Referring to FIGS. 3 and 4, as stated above, the computer mounting arm 28 may be mounted on a headwall 12 including raceways 12a and 12b protruding outwardly from the wall 11. In this application, a channel 61 is provided including upper 62 and lower 64 brackets which are secured, respectively, to the upper raceway 12a and the intermediate raceway 12b by mounting screws 66. The upper 62 and lower 64 brackets include lips 62a and 64a, respectively, which engage like lips 68a and 68b of the upper 12a and intermediate 12b raceways, respectively, to clamp the brackets 62, 64 to the raceways 12a, 12b. Channel 61 extends between the two raceways 12a, 12b and is secured to the upper and lower brackets 62, 64 by means of screws 70 passing therethrough. Left and right side panels 72, 74 attach to channel 61 to conceal the mounting brackets 62, 64.

A back plate 76 is located between the back of the wall bracket 38 and the front of the channel 61. A pair of bolts 78 pass through the wall bracket 38 of the computer mounting arm 28, through the back plate 76, and extend behind the channel 61 into the space between the upper and intermediate raceways 12a, 12b. Coil springs 80 are located behind channel 61 on the mounting bolts 78 and are placed in compression by means of a nut and washer assembly 82 at the end of the bolts 78. Compression of the coil springs by tightening of the nut and washer assembly 82 on the bolts 78 applies a spring force holding the wall bracket 38 of the computer mounting arm 28 to the channel 61 which in turn is secured to the headwall 12. The holes in the wall bracket 38, back plate 76, and channel 61 through which bolts 78 pass are sufficiently large to permit the bolts 78 to slide therein. Accordingly, if the computer mounting arm in its extended position is accidentally bumped, for example, by a piece of equipment moving in the room, transmission of the force from the computer mounting bracket 36 to the wall bracket 38 will cause the coil springs 80 to compress thus permitting the arm 28 to flex with respect to the channel 61 and thus with respect to the hospital room wall 11. Once this force is removed, the coil springs 80 then expand outwardly once again bringing the wall bracket 38 back into its position against the channel 61.

The amount of tension placed on bolts 78 may be adjusted to a desired level by the selection of the compression springs and amount of compression placed on the springs by tightening of the nut and washer assembly 82. Accordingly, the amount of force required to flex the arm 28 away from the wall may be varied as desired.

Referring to FIG. 5, the computer mounting arm 28 may also be mounted directly to the hospital room wall 11. This is accomplished by securing a wall mounting plate 84 to the wall studs 86 supporting the room wall 11 by means such as angular brackets 88. The bolts 78 pass through the wall bracket 38 of the computer mounting arm 28, through clearance holes 90 in back plate 76 and through the wall mounting plate 84. Back plate 76 is bolted to the wall mounting plate 84 by means of bolts 91 whose heads are in clearance holes 91a. The coil springs 80 extend between the back of the back plate 76 and the nut and washer assembly 82 at the end of the bolts 78 and are retained in through openings 92 in the wall mounting plate 84. Again, should the computer mounting arm be accidentally bumped, the coil springs 80 will compress permitting flexing of the wall bracket 38 and consequently mounting arm 28 with respect to the wall 11.

Although the invention has been described in connection with mounting of a computer, it will be appreciated that other terminals or data entry, storage, and retrieval equipment could likewise be mounted to the mounting arm.

Thus having described the invention, what is claimed is:

1. An extendable and retractable computer mounting arm for mounting a computer to the wall of a patient treatment room allowing in the retracted position the computer to be stored close to the wall and in the extended position electronic information to be accessed through the computer at a point of patient care zone spaced from the wall, said computer mounting arm comprising:

a computer mounting bracket having a front side and a back side, a wall mounting bracket for mounting with respect to the wall of a patient treatment room, an extended support arm extending between and pivotally mounted to said computer mounting bracket and said wall mounting bracket, said support arm being movable in a generally vertical plane lying perpendicular to the plane of said wall between said retracted position wherein said support arm is in a generally vertically upright position and said back side of said computer mounting bracket is in close proximity to the wall and said extended position wherein said computer mounting bracket extends into the point of patient care zone, and mounting means for mounting said wall mounting bracket with respect to the wall of said patient treatment room under a spring force operative to normally hold said wall mounting bracket with respect to the wall while permitting said wall mounting bracket to flex with respect to the wall on imposition of a force to said computer mounting arm sufficient to overcome said spring force to prevent said computer mounting arm from being accidentally dislodged from its mounted relationship with the wall.

2. The computer mounting arm of claim further comprising a substantially constant force rate pneumatic spring extending between and pivotally mounted to said computer mounting bracket and said wall mounting bracket to assist in extending and retracting said computer mounting arm, said spring being movable in a generally vertical plane lying perpendicular to the plane of said wall and parallel to the plane of movement of said support arm, said spring in said retracted position of said mounting arm being likewise in a generally vertically upright position and in close proximity to said wall.

3. The computer mounting arm of claim 1 further comprising a channel adapted to be mounted to the raceways of a head wall in turn adapted to be mounted to said patient treatment room wall, said mounting means for mounting said wall mounting bracket with respect to the wall of said patient treatment room comprising bolts passing through said wall mounting bracket and said channel, coil springs mounted to said bolts between said channel and said patient treatment room wall, and nuts for compressing said coil springs on said bolts.

4. The computing mounting arm of claim 1 wherein said wall of said patient treatment room includes wall studs and wherein said mounting means for mounting said wall mounting bracket with respect to said wall of said patient treatment room comprises a wall mounting plate adapted to secured to said wall studs, bolts passing through said wall mounting bracket and said wall mounting plate, coil springs mounted on said bolts behind said patient treatment room wall and nuts for compressing said coil springs on said bolts.

5. An extendable and retractable computer mounting arm for mounting a computer to the wall of a patient treatment room allowing in the retracted position the computer to be stored close to the wall and in the extended position electronic information to be accessed through the computer at a point of patient care zone spaced from the wall, said computer mounting arm comprising:

a computer mounting bracket having a front side and a back side, a wall mounting bracket for mounting with respect to the wall of a patient treatment room, a pair of extended support arms extending between and pivotally mounted to said computer mounting bracket and said wall mounting bracket, said support arms being movable in generally parallel first and second vertical planes lying perpendicular to the plane of said wall between said retracted position wherein said support arms are in a generally vertically upright position and said back side of said computer mounting bracket is in close proximity to the wall and said extended position wherein said computer mounting bracket extends to a point of patient care, said support arms carrying electrical and data linking wiring between said computer mounting bracket and said wall mounting bracket, a pneumatic spring extending between and pivotally mounted to said computer mounting bracket and said wall mounting bracket to assist in extending and retracting said computer mounting arm, said pneumatic spring being movable in a generally vertical plane lying perpendicular to the plane of said wall and parallel to said first and second vertical planes of movement of said support arms, said spring in said retracted position of said mounting arms being likewise in a generally vertically upright position and in close proximity to said wall, and mounting means for mounting said wall mounting bracket with respect to the wall of said patient treatment room under a spring force operative to normally hold said wall mounting bracket with respect to the wall while permitting said wall mounting bracket to flex with respect to the wall on imposition of a force to said computer mounting arm sufficient to overcome said spring force to prevent said computer mounting arm from being accidentally dislodged from its mounted relationship with the wall.

6. The computer mounting arm of claim 5 wherein one of said support arms includes a cylindrical boss pivotally mounted to said computer mounting bracket, the opposite end thereof being pivotally mounted to said wall mounting bracket; and the other of said supporting arms including a cylindrical boss being pivotally mounted to said wall mounting bracket and the other end thereof being pivotally mounted to said computer mounting bracket.

7. The computer mounting arm of claim 5 wherein said support arms include a recess for receiving said electrical and data linking wiring and a cover plate for enclosing said wiring in said recess.

8. The computer mounting arm of claim 6 wherein said cylindrical boss of said one support arm and said cylindrical boss of said other support arm further include clevises, said pneumatic spring extending between and being pivotally mounted to said clevises.

9. An extendable and retractable computer mounting arm for mounting a computer to the wall of a patient treatment room allowing in the retracted position the computer to be stored close to the wall and in the extended position electronic information to be accessed through the computer at a point of patient care zone spaced from the wall, said computer mounting arm comprising:

a computer mounting bracket having a front side and a back side, a wall mounting bracket for mounting with respect to the wall of a patient treatment room, a first extended support arm extending between said computer mounting bracket and said wall mounting bracket comprising a cylindrical boss at one end thereof received in a recess in said computer mounting bracket and pivotally mounted to said computer mounting bracket, the opposite end of said first support arm being pivotally mounted to said wall mounting bracket, a second extended support arm extending between said computer mounting bracket and said wall mounting bracket comprising a cylindrical boss extending between the sides of said wall mounting bracket and being pivotally connected thereto, the opposite end of said second support arm being pivotally connected to said computer mounting bracket, said cylindrical boss of said first support arm and said cylindrical boss of said second support arm having opposed clevises located generally centrally between the respective ends thereof, a pneumatic spring extending between and pivotally mounted to said clevises to assist in extending and retracting said computer mounting arm, said first and second support arms including recesses for receiving electrical and data linking cables extending between said computer mounting bracket and said wall mounting bracket, and said first and second support arms being movable in generally parallel first and second vertical planes lying perpendicular to the plane of said wall between a retracted position wherein said support arms are in a generally vertically upright position and said back side of said computer mounting bracket is in close proximity to said wall and said extended position wherein said computer mounting bracket extends into the point of patient care zone, mounting means for mounting said wall mounting bracket with respect to the wall of said patient treatment room comprising bolts passing through said wall mounting bracket, coil springs surrounding the ends of said bolts and nuts receivable on said bolts for compressing said coil springs, said coil springs applying a spring force relative to said wall mounting bracket and said patient treatment room wall operative to normally hold said wall mounting bracket with respect to said patient treatment room wall while permitting said wall mounting bracket to flex with respect to said wall on imposition of a force to said computer mounting arm sufficient to overcome said spring force to prevent said computer mounting arm from being accidentally dislodged from its mounted relationship with the wall.

10. An extendable and retractable computer mounting arm for mounting a computer to the wall of a patient treatment room allowing in the retracted position the computer to be stored close to the wall and in the extended position electronic information to be accessed through the computer at a point of patient care zone spaced from the wall, said computer mounting arm comprising:
  a computer mounting bracket having a front side and a back side,
  a wall mounting bracket for mounting with respect to the wall of a patient treatment room,
  a pair of extended support arms extending between and pivotally mounted to said computer mounting bracket and said wall mounting bracket, said support arms being movable in generally parallel first and second vertical planes lying perpendicular to the plane of said wall between said retracted position wherein said support arms are in a generally vertically upright position and said back side of said computer mounting bracket is in close proximity to the wall and said extended position wherein said computer mounting bracket extends to a point of patient care, said support arms carrying electrical and data linking cabling between said computer mounting bracket and said wall mounting bracket,
  means extending between and pivotally mounted to said computer mounting bracket and said wall mounting bracket to assist in extending and retracting said computer mounting arm, and
  mounting means for mounting said wall mounting bracket with respect to the wall of said patient treatment.

11. The computer mounting arm of claim 10 wherein said means to assist in extending and retracting said computer mounting arm comprise a pneumatic spring extending between and pivotally mounted to said computer mounting bracket and said wall mounting bracket.

12. The computer mounting arm of claim 10 wherein said support arms include a recess for receiving said electrical and data linking cabling and a cover plate for enclosing said cabling in said recess.

13. The computer mounting arm of claim 10 wherein one of said support arms includes a cylindrical boss pivotally mounted to said computer mounting bracket, the opposite end thereof being pivotally mounted to said wall mounting bracket; and the other of said supporting arms including a cylindrical boss being pivotally mounted to said wall mounting bracket and the other end thereof being pivotally mounted to said computer mounting bracket.

14. The computer mounting arm of claim 13 wherein said cylindrical boss of said one support arm and said cylindrical boss of said other support arm further include clevises, and said means to assist in extending and retracting said computer mounting arm comprising a pneumatic spring extending between and being pivotally mounted to said clevises.

15. An extendable and retractable computer mounting arm for mounting a computer to the wall of a patient treatment room allowing in the retracted position the computer to be stored close to the wall and in the extended position electronic information to be accessed through the computer at a point of patient care zone spaced from the wall, said computer mounting arm comprising:
  a computer mounting bracket having a front side and a back side,
  a wall mounting bracket for mounting with respect to the wall of a patient treatment room,
  a first extended support arm extending between said computer mounting bracket and said wall mounting bracket comprising a cylindrical boss at one end thereof received in a recess in said computer mounting bracket and pivotally mounted to said computer mounting bracket, the opposite end of said first support arm being pivotally mounted to said wall mounting bracket,
  a second extended support arm extending between said computer mounting bracket and said wall mounting bracket comprising a cylindrical boss extending between the sides of said wall mounting bracket and being pivotally connected thereto, the opposite end of said second support arm being pivotally connected to said computer mounting bracket,
  said cylindrical boss of said first support arm and said cylindrical boss of said second support arm having opposed clevises located generally centrally between the respective ends thereof,
  means extending between and pivotally mounted to said clevises to assist in extending and retracting said computer mounting arm,
  said first and second support arms including recesses for receiving electrical and data linking cables extending between said computer mounting bracket and said wall mounting bracket, and
  said first and second support arms being movable in generally parallel first and second vertical planes lying perpendicular to the plane of said wall between a retracted position wherein said support arms are in a generally vertically upright position and said back side of said computer mounting bracket is in close proximity to said wall and said extended position wherein said computer mounting bracket extends into the point of patient care zone,
  mounting means for mounting said wall mounting bracket with respect to the wall of said patient treatment room.

* * * * *

UNITED STATES PATENT AND TRADEMARK OFFICE
CERTIFICATE OF CORRECTION

PATENT NO. : 5,108,063
DATED : April 28, 1992
INVENTOR(S) : Clement J. Koerber, Sr. et al It is certified that error appears in the above-identified patent and that said Letters Patent is hereby corrected as shown below:

Column 3, line 42, "physical" should be --physician--.

Column 8, line 19, "a patient" should be --the patient--.

Signed and Sealed this

Twenty-fourth Day of August, 1993

Attest:

BRUCE LEHMAN

*Attesting Officer*     *Commissioner of Patents and Trademarks*